United States Patent
Noro

(10) Patent No.: US 9,772,008 B2
(45) Date of Patent: Sep. 26, 2017

(54) TENSIONER LEVER

(71) Applicant: TSUBAKIMOTO CHAIN CO., Osaka-shi, Osaka (JP)

(72) Inventor: Kazushi Noro, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 101 days.

(21) Appl. No.: 15/044,500

(22) Filed: Feb. 16, 2016

(65) Prior Publication Data

US 2016/0252166 A1 Sep. 1, 2016

(30) Foreign Application Priority Data

Feb. 27, 2015 (JP) ................................ 2015-038396

(51) Int. Cl.
*F16H 7/08* (2006.01)

(52) U.S. Cl.
CPC .......... *F16H 7/08* (2013.01); *F16H 2007/081* (2013.01); *F16H 2007/0872* (2013.01); *F16H 2007/0893* (2013.01)

(58) Field of Classification Search
CPC .............. F16H 7/08; F16H 2007/081; F16H 2007/0842; F16H 2007/0872; F16H 2007/0893; F02B 67/06
See application file for complete search history.

(56) References Cited

U.S. PATENT DOCUMENTS 6,428,435 B1 * 8/2002 Kumakura ................ F16H 7/08
474/111
2009/0111629 A1 * 4/2009 Kobara .................... F02B 67/06
474/111

FOREIGN PATENT DOCUMENTS

JP 2012-36996 A 2/2012

* cited by examiner

*Primary Examiner* — William E Dondero
*Assistant Examiner* — Robert T Reese
(74) *Attorney, Agent, or Firm* — Westerman, Hattori, Daniels & Adrian, LLP

(57) ABSTRACT

An object of the present invention is to provide a tensioner lever that can reliably prevent displacement or detachment of a torsion coil spring, prevent the torsion coil spring from interfering with an attachment surface, and allow smooth attachment of the tensioner lever to the attachment surface. The tensioner lever includes a lever body having a shoe surface, and a torsion coil spring pressing the shoe surface toward a chain. The lever body includes a base part and a cylindrical boss. The torsion coil spring includes a helical part loosely fitted on an outer circumferential surface of the boss, a pressing arm making contact with the lever body, and a support arm supported on the attachment surface. The outer circumferential surface of the boss includes a restricting protrusion formed at a position closer to the attachment surface than the helical part.

4 Claims, 2 Drawing Sheets

TENSIONER LEVER

BACKGROUND OF THE INVENTION

1. Field of the Invention

The present invention relates to a tensioner lever that slidably guides a running chain, and more particularly to a chain tensioner lever that slidably guides a chain by pressing a shoe surface of a lever body against the chain by the resilient force of a torsion coil spring.

2. Description of the Related Art

As an example of tensioner levers used to remove slackness in chains and to prevent vibration of running chains in conventional chain transmission devices used for driving auxiliary machines or the like of car engines, a tensioner lever, which is pivotably attached to an attachment surface of an engine block or the like and includes a lever body having a shoe surface that slidably guides the chain, and a torsion coil spring interposed between the lever body and the attachment surface to press the shoe surface toward the chain, has been known (see, for example, Japanese Patent Application Laid-open No. 2012-36996).

In the tensioner lever described in Japanese Patent Application Laid-open No. 2012-36996, the helical part of the torsion coil spring is loosely fitted on an outer circumferential surface of a boss formed on a base part of the lever body and protruding toward the attachment surface. A pressing arm extending from one end of the helical part is disposed to contact the lever body. A support arm extending from the other end of the helical part is, when the tensioner lever is attached to the attachment surface, inserted in a spring holder hole formed in the attachment surface, while, before the tensioner lever is attached to the attachment surface, is engaged with and stopped by a stopper pin mounted to the lever body.

SUMMARY OF THE INVENTION

In the conventional tensioner lever, since the helical part of the torsion coil spring is loosely fitted on the outer circumferential surface of the boss, when an external force is applied to the torsion coil spring in a state before the tensioner lever is attached to the attachment surface, for example during transport or delivery of the tensioner lever, the helical part of the torsion coil spring would sometimes displace from the predetermined mounting position on the outer circumferential surface of the boss, and in some cases fall off of the lever body.

When attaching the tensioner lever to the attachment surface of an engine block or the like, an operator may sometimes have to perform the attachment operation without being able to see the torsion coil spring sufficiently. The problem in such a case is that the torsion coil spring may be accidentally subjected to a force during the operation and may be displaced from or come off of the lever body, because of which sometimes the attachment operation of the tensioner lever may not be performed smoothly.

Even after the tensioner lever has been attached to the attachment surface of the engine block or the like, the helical part of the torsion coil spring may move on the outer circumferential surface of the boss toward the attachment surface side due to vibration or the like when the chain runs and the torsion coil spring may interfere with the attachment surface of the engine block or the like, which would lead to the problem of damage to the torsion coil spring or the attachment surface.

The present invention solves these problems and an object of the invention is to provide a tensioner lever that can, with a simple structure, reliably prevent displacement or detachment of a torsion coil spring, prevent the torsion coil spring from interfering with an attachment surface, and allow smooth attachment of the tensioner lever to the attachment surface.

The present invention achieves the above object by providing a tensioner lever including a lever body having a shoe surface for slidably guiding a chain, and a torsion coil spring interposed between the lever body and an attachment surface to press the shoe surface toward the chain. The lever body includes a base part having a shaft hole, and a cylindrical boss having an outer circumferential surface protruding from a peripheral edge of the shaft hole. The torsion coil spring includes a helical part loosely fitted on the outer circumferential surface of the boss, a pressing arm extending from one end of the helical part and making contact with the lever body, and a support arm extending from the other end of the helical part and supported on the attachment surface. The outer circumferential surface of the boss includes a restricting protrusion formed at a position closer to the attachment surface than the helical part.

According to one aspect of the present invention, the torsion coil spring includes a helical part loosely fitted on the outer circumferential surface of the boss, a pressing arm extending from one end of the helical part and making contact with the lever body, and a support arm extending from the other end of the helical part and supported on the attachment surface, and the outer circumferential surface of the boss includes a restricting protrusion formed at a position closer to the attachment surface than the helical part. This restricting protrusion can restrict the movement of the helical part on the outer circumferential surface of the boss toward the attachment surface side. This way, any possible displacement or detachment of the torsion coil spring from the lever body in a state before the tensioner lever is attached to the attachment surface is reliably prevented, and also, the torsion coil spring is reliably prevented from interfering with the attachment surface in a state after the tensioner lever has been attached to the attachment surface, with a simple structure.

Since displacement or detachment of the torsion coil spring from the lever body can be prevented, the tensioner lever can be smoothly attached to the attachment surface.

According to another aspect of the present invention, the restricting protrusion is formed on the side of an imaginary line toward which the pressing arm presses the lever body, the imaginary line passing through a contact point between the pressing arm and the lever body and a center of the boss. By forming the restricting protrusion at a position where there is only a small gap or no gap between the helical part of the torsion coil spring and the outer circumferential surface of the boss both before and after attaching the tensioner lever to the attachment surface, the movement of the helical part toward the attachment surface side can be restricted reliably without designing the restricting protrusion to have a large height or width. Since the restricting protrusion can be designed to have a small height and width, the restricting protrusion can be prevented from becoming a hindrance to the operation of mounting the torsion coil spring to the lever body.

According to another aspect of the present invention, the restricting protrusion is formed to include a portion where a second imaginary line intersects with the outer circumferential surface of the boss, the second imaginary line being orthogonal to the imaginary line and passing through the center of the boss, whereby the movement of the helical part toward the attachment surface side can be restricted even more reliably without designing the restricting protrusion to have a large height or width.

According to yet another aspect of the present invention, the restricting protrusion is formed on the side of a third imaginary line toward which the support arm presses the lever body, the third imaginary line passing through a contact point between the support arm and a stopper pin and the center of the boss. The movement of the helical part toward the attachment surface side can be restricted reliably, by forming the restricting protrusion at a position where there is only a small gap or no gap between the helical part of the torsion coil spring and the outer circumferential surface of the boss before attaching the tensioner lever to the attachment surface, i.e., in a state where the support arm is retained by the stopper pin.

DESCRIPTION OF THE PREFERRED EMBODIMENTS

A tensioner lever 10 according to one embodiment of the present invention will be hereinafter described with reference to the drawings.

Figure 1:
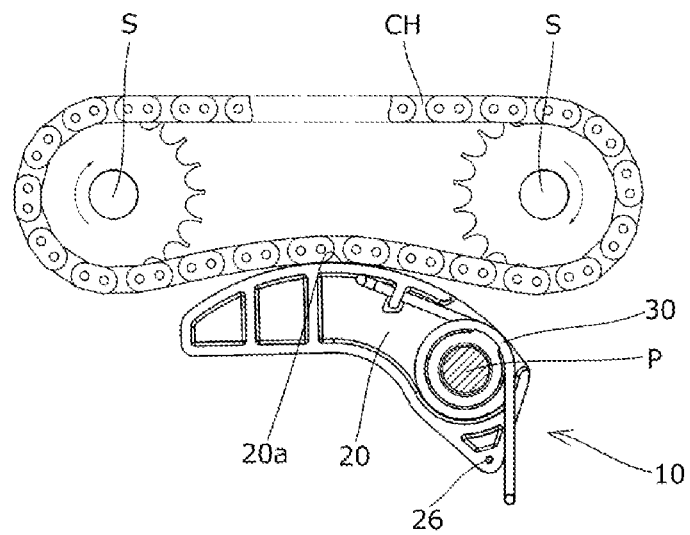
FIG. 1 is a diagram illustrating one form of use of a tensioner lever according to one embodiment of the present invention viewed from an attachment surface side.

The tensioner lever 10, as shown in FIG. 1, is pivotably mounted on a pivot shaft P protruding from an attachment surface (not shown) of an engine block (not shown) or the like to slidably guide a chain CH running between a plurality of sprockets S to keep an appropriate chain tension.

Figure 2:
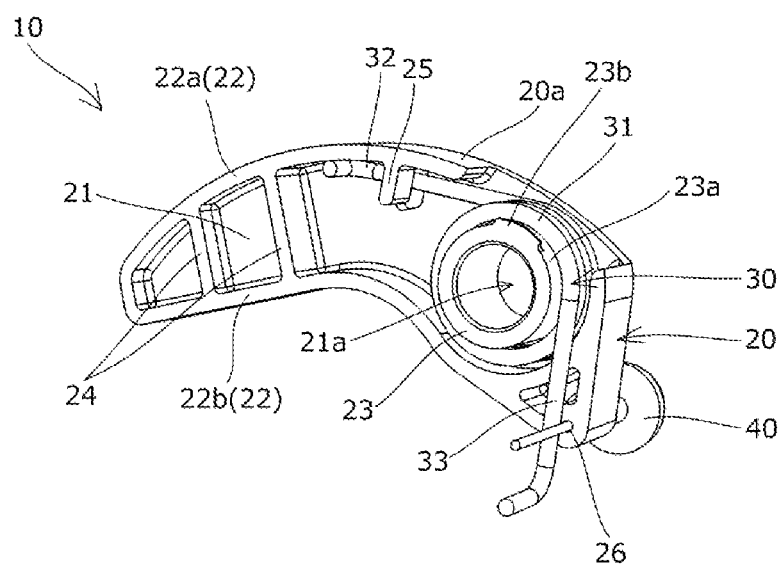
FIG. 2 is a perspective view illustrating the tensioner lever.

As shown in FIG. 2, the tensioner lever 10 includes a lever body 20 made of a synthetic resin or the like, a torsion coil spring 30 made of metal or the like, and a stopper pin 40.

Figure 3:
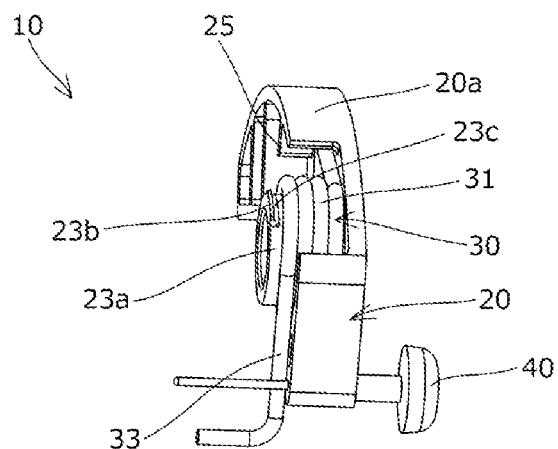
FIG. 3 is a perspective view illustrating the tensioner lever seen from a different angle from the angle of FIG. 2.

The lever body 20 includes, as shown in FIG. 2 and FIG. 3, a planar base part 21 disposed a certain distance away from the attachment surface, a lever circumferential wall 22 standing upright from the peripheral edge of the base part 21 toward the attachment surface, a cylindrical boss 23 protruding from the peripheral edge of a shaft hole 21a formed in the base part 21 toward the attachment surface, a plurality of reinforcing ribs 24 formed between a chain-side circumferential wall 22a and a non-chain-side circumferential wall 22b of the lever circumferential wall 22, a spring retaining part 25 that protrudes from an inner surface of the chain-side circumferential wall 22a and stops a pressing arm 32 of the torsion coil spring 30 by making engagement therewith, and a pin retaining hole 26 for retaining the stopper pin 40.

A shoe surface 20a that slidably guides the chain CH is formed on a side face of the lever body 20 facing the chain CH (outer surface of the chain-side circumferential wall 22a).

The pivot shaft P is inserted into the shaft hole 21a and the boss 23 of the base part 20, whereby the lever body 20 is pivotably (rotatably) supported on the attachment surface.

The lever circumferential wall 22 includes the chain-side circumferential wall 22a disposed on the chain CH side and the non-chain-side circumferential wall 22b. The chain-side circumferential wall 22a includes a cut-out region in a portion facing the helical part 31 of the torsion coil spring 30.

The end face of the boss 23 on the attachment surface side is formed to protrude slightly more toward the attachment surface than the lever circumferential wall 22, which prevents other parts than this end face on the attachment surface side of the boss 23 from contacting the attachment surface, so that smooth pivoting (rotation) of the lever body 20 around the pivot shaft P is ensured.

The torsion coil spring 30 is interposed between the lever body 20 and the attachment surface when the tensioner lever 10 is attached to the attachment surface as shown in FIG. 1 to press the shoe surface 20a of the lever body 20 toward the chain CH by the resilient force it generates. As shown in FIG. 2 and FIG. 3, the torsion coil spring 30 includes the helical part 31, a pressing arm 32 extending from one end of the helical part 31, and a support arm 33 extending from the other end of the helical part 31.

The helical part 31 loosely fits on the outer circumferential surface 23a of the boss 23, i.e., is disposed with a gap between itself and the outer circumferential surface 23a of the boss, as shown in FIG. 2 and FIG. 3.

The pressing arm 32 is disposed such that part of it is in contact with an inner surface of the chain-side circumferential wall 22a.

The support arm 33 has a distal end that is bent toward the attachment surface. When the tensioner lever 10 is attached to the attachment surface, the distal end of the support arm 33 is inserted in and supported by a spring holder hole (not shown) formed in the attachment surface. Before the tensioner lever 10 is attached to the attachment surface, the support arm is retained by the stopper pin 40 as shown in FIG. 2.

Before the tensioner lever 10 is attached to the attachment surface, the stopper pin 40 is inserted into the pin retaining hole 26 of the lever body 20 to temporarily retain the support arm 33 of the torsion coil spring 30, as shown in FIG. 2 and FIG. 3. When the tensioner lever 10 is attached to the attachment surface, the stopper pin 40 is pulled out and removed from the pin retaining hole 26 as shown in FIG. 1.

Below, a restricting protrusion 23b on the outer circumferential surface 23a of the boss, which is the characteristic feature of the tensioner lever 10, will be described.

The restricting protrusion 23b is formed on the outer circumferential surface 23a of the boss at the end on the attachment surface side as shown in FIG. 2 and FIG. 3 to restrict the movement of the helical part 31 disposed on the outer circumferential surface 23a of the boss toward the attachment surface side. This way, in a state before the tensioner lever 10 is attached to the attachment surface, the torsion coil spring 30 is prevented from coming off of the lever body 20, and also, in a state where the tensioner lever 10 is attached to the attachment surface, the torsion coil spring 30 is prevented from interfering with the attachment surface. The movement of the helical part 31 toward the opposite side from the attachment surface is restricted by the base part 21.

The restricting protrusion 23b is tapered from the proximal end on the outer circumferential surface 23a of the boss toward the distal end as shown in FIG. 3. This way, breakage of the restricting protrusion 23b can be reduced. The side face 23c of the restricting protrusion 23b opposite the helical part 31 is concavely curved so that local contact between the helical part 31 and the restricting protrusion 23b is avoided.

In this embodiment, the position where the restricting protrusion 23b is formed is determined as follows.

Figure 4:
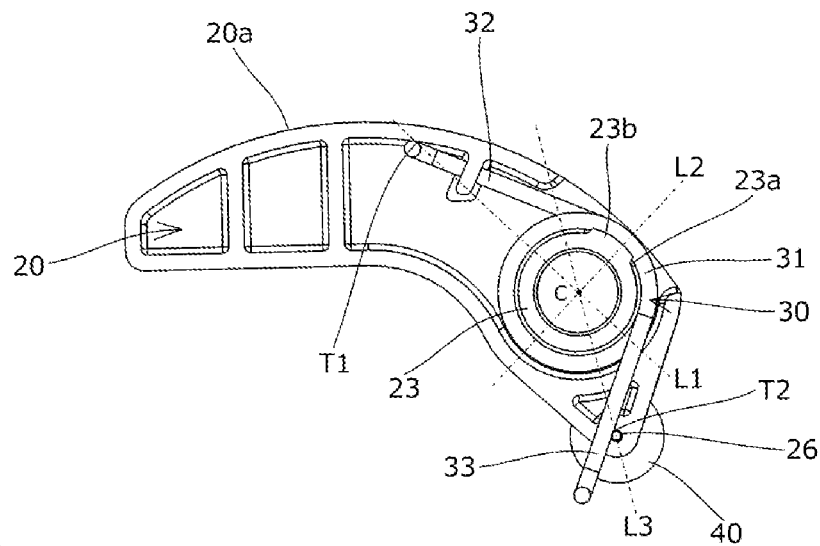
FIG. 4 is an explanatory diagram illustrating the tensioner lever viewed from the attachment surface side.

When viewed from an axial direction of the boss 23, as shown in FIG. 4, the restricting protrusion 23b is formed on the side of a first imaginary line L1 toward which the pressing arm 32 presses the lever body 20. Also, the restricting protrusion 23b is formed to include a portion where a second imaginary line L2 intersects with the outer circumferential surface 23a of the boss. Moreover, the restricting protrusion 23b is formed on the side of a third imaginary line L3 toward which the support arm 33 presses the lever body 20.

Here, the first imaginary line L1 mentioned above is an imaginary line passing through a contact point T1 between the pressing arm 32 and the lever body 20, and the center C of the boss 23. The second imaginary line L2 mentioned above is an imaginary line orthogonal to the first imaginary line L1 and passing through the center C of the boss 23. The third imaginary line L3 mentioned above is an imaginary line passing through a contact point T2 between the support arm 33 and the stopper pin 40, and the center C of the boss 23.

The position of the restricting protrusion 23b is not limited to the one described above and the protrusion may be formed anywhere as long as it can restrict the movement of the helical part 31 toward the attachment surface side. Also, the height of the restricting protrusion 23b (protruding amount from the outer circumferential surface 23a of the boss), the width of the restricting protrusion 23b in the circumferential direction of the outer circumferential surface 23a of the boss, and the shape of the restricting protrusion 23b can be freely selected as long as the protrusion can restrict the movement of the helical part 31 toward the attachment surface side.

While one embodiment of the present invention has been described in detail, the present invention is not limited to the above-described embodiment and may be carried out with various design changes without departing from the scope of the present invention set forth in the claims.

For example, while one restricting protrusion is formed on the outer circumferential surface of the boss in the embodiment described above, a plurality of restricting protrusions may be formed on the outer circumferential surface of the boss.

In the embodiment described above, the pivot shaft protruding from the attachment surface of an engine block or the like is inserted into the shaft hole in the lever body. Instead, a bolt or the like inserted into the shaft hole in the lever body may be attached to the attachment surface of an engine block or the like.

In the embodiment described above, while the restricting protrusion on the outer circumferential surface of the boss is formed at the end on the attachment surface side of the outer circumferential surface of the boss, the restricting protrusion need only be formed closer to the attachment surface than the helical part disposed on the outer circumferential surface of the boss.

What is claimed is:

1. A tensioner lever comprising:
   a lever body having a shoe surface for slidably guiding a chain; and
   a torsion coil spring interposed between the lever body and an attachment surface of an engine block, to which the tensioner lever is attached, to press the shoe surface toward the chain,
   the lever body including a base part having a shaft hole, and a cylindrical boss having an outer circumferential surface protruding from a peripheral edge of the shaft hole,
   the torsion coil spring including a helical part loosely fitted on the outer circumferential surface of the boss, a pressing arm extending from one end of the helical part and making contact with the lever body, and a support arm extending from the other end of the helical part and supported on the attachment surface, and
   the outer circumferential surface of the boss including a restricting protrusion formed at a position closer to the attachment surface than the helical part.

2. The tensioner lever according to claim 1, wherein the restricting protrusion is formed on the side of an imaginary line toward which the pressing arm presses the lever body, the imaginary line passing through a contact point between the pressing arm and the lever body and a center of the boss.

3. The tensioner lever according to claim 2, wherein the restricting protrusion is formed to include a portion where a second imaginary line intersects with the outer circumferential surface of the boss, the second imaginary line being orthogonal to the imaginary line and passing through the center of the boss.

4. The tensioner lever according to claim 1, further comprising a stopper pin inserted in a pin retaining hole formed in the lever body to stop the support arm by making engagement therewith,
   wherein the restricting protrusion is formed on the side of a third imaginary line toward which the support arm presses the lever body, the third imaginary line passing through a contact point between the support arm and the stopper pin and a center of the boss.

* * * * *